United States Patent
Moon et al.

(10) Patent No.: US 7,410,717 B2
(45) Date of Patent: Aug. 12, 2008

(54) SOLID OXIDE FUEL CELL(SOFC) FOR COPRODUCING SYNGAS AND ELECTRICITY BY THE INTERNAL REFORMING OF CARBON DIOXIDE BY HYDROCARBONS AND ELECTROCHEMICAL MEMBRANE REACTOR SYSTEM

(75) Inventors: Dong Ju Moon, Seoul (KR); Jong Woo Ryu, Seoul (KR); Jong Min Park, Ulsan (KR); Byung Gwon Lee, Seoul (KR); Sang Deuk Lee, Seoul (KR)

(73) Assignee: Korea Institute of Science & Technology, Seoul (KR)

( * ) Notice: Subject to any disclaimer, the term of this patent is extended or adjusted under 35 U.S.C. 154(b) by 551 days.

(21) Appl. No.: 10/830,225

(22) Filed: Apr. 23, 2004

(65) Prior Publication Data
US 2005/0089740 A1    Apr. 28, 2005

(30) Foreign Application Priority Data
Oct. 25, 2003    (KR) .................... 10-2003-0074934

(51) Int. Cl.
H01M 8/10    (2006.01)
H01M 4/86    (2006.01)
H01M 4/90    (2006.01)
H01M 8/04    (2006.01)

(52) U.S. Cl. .................... 429/33; 429/30; 429/40
(58) Field of Classification Search .................... 429/40, 429/41, 44, 30, 33
See application file for complete search history.

(56) References Cited

U.S. PATENT DOCUMENTS

| | | | |
|---|---|---|---|
| 5,071,719 A | * | 12/1991 | Rostrup-Nielsen et al. .... 429/19 |
| 5,500,307 A | * | 3/1996 | Anzai et al. .................... 429/30 |
| 5,656,387 A | * | 8/1997 | Barnett et al. ................. 429/33 |
| 5,908,713 A | | 6/1999 | Ruka et al. |
| 6,187,465 B1 | | 2/2001 | Galloway |
| 6,316,138 B1 | | 11/2001 | Satake et al. |
| 6,610,434 B1 | | 8/2003 | Draper et al. |

FOREIGN PATENT DOCUMENTS

JP    06342663 A  * 12/1994

OTHER PUBLICATIONS

J. Staniforth et al. "Biogas Powering a Small Tubular Solid Oxide Fuel Cell" J. of Power Sources 71 (1998) pp. 275-277.*
Park, S. et al., "Direct Oxidation of Hydrocarbons in a Solid-Oxide Fuel Cell", Nature, vol. 404, pp. 265-267, (Mar. 16, 2000).

(Continued)

*Primary Examiner*—Gregg Cantelmo
(74) *Attorney, Agent, or Firm*—Finnegan Henderson Farabow Garrett & Dunner LLP

(57) ABSTRACT

The present invention relates to a solid oxide fuel cell for internal reforming of hydrocarbons and carbon dioxide, in particular, to a solid oxide fuel cell in which one side of solid oxide electrolyte (YSZ) is attached to an air electrode ($La_{0.8}Sr_{0.2}MnO_3$) and its other side is attached to a catalyst electrode of Ni-YSZ type or perovskite type metal oxide. The electrochemical conversion system using the solid oxide fuel cell permits the occurrence of internal reforming of hydrocarbons and carbon dioxide concomitantly with the coproduction of a syngas and electricity, and overcomes the shortcomings associated with the catalytic deactivation due to carbon deposition and the high-energy consumption.

5 Claims, 4 Drawing Sheets

OTHER PUBLICATIONS

Moon, D. J. et al., "Electrocatalytic Reforming of Carbon Dioxide by Methane in SOFC System", Catalysis Today, vol. 3183, pp. 1-10, (2003).

Moon, D. J. et al., "Electrocatalytic Reforming of Carbon Dioxide by Methane in SOFC Membrane Reactor System", Book of Extended Abstracts, The 9th Korea-Japan Symposium on Catalysis, pp. 271-273, (May 14-17, 2003).

Yoo, J. Y. et al., "Internal Reforming of Carbon Dioxide by Methane in SOFC System", Theories and Applications of Chem. Eng., vol. 9, No. 1, pp. 1138-1141, (2003).

Ishihara, T. et al., "Partial Oxidation of Methane Over Fuel Cell Type Reactor for Simultaneous Generation of Synthesis Gas and Electric Power", Chemical Engineering Science, vol. 54, pp. 1535-1540, (1999).

* cited by examiner

SOLID OXIDE FUEL CELL(SOFC) FOR COPRODUCING SYNGAS AND ELECTRICITY BY THE INTERNAL REFORMING OF CARBON DIOXIDE BY HYDROCARBONS AND ELECTROCHEMICAL MEMBRANE REACTOR SYSTEM

DESCRIPTION OF THE INVENTION

1. Field of the Invention

The present invention relates to a solid oxide fuel cell for internal reforming of hydrocarbons and carbon dioxide, in particular, to a solid oxide fuel cell in which one side of solid oxide electrolyte (YSZ) is attached to an air electrode ($La_{0.8}Sr_{0.2}MnO_3$) while its other side is attached to a catalyst electrode of Ni-YSZ type or perovskite type metal oxide. The electrochemical conversion system using the solid oxide fuel cell permits the occurrence of internal reforming of hydrocarbon and carbon dioxide concomitantly with the coproduction of a syngas and electricity, and overcomes the shortcomings associated with the catalyst deactivation due to carbon deposition and the high-energy consumption.

2. Description Related Art

Reforming reactions of carbon dioxide ($CO_2$) and methane ($CH_4$) have been extensively studied as the importance of removal and emission control of greenhouse gases have been highlighted throughout the world. Furthermore, the reforming reactions of carbon dioxide and methane can generate hydrogen ($H_2$) and carbon monoxide (CO) serving as important raw materials in the petrochemical industry and therefore a lot of researches have been made.

However, the catalytic reforming reaction of carbon dioxide ($CO_2$) and methane ($CH_4$) is associated with high-energy consumption due to its endothermic reaction as described in Scheme 1 and is very likely to result in catalyst deactivation due to the occurrence of carbon deposition.

$$CO_2 + CH_4 \rightarrow CO + H_2 \quad \Delta H°_{298} = 247 \text{ KJ/mol} \quad (1)$$

In the reforming reaction of carbon dioxide by methane, if a transition metal instead of a noble metal is used as a catalyst, the catalyst is no longer involved in a reaction within several hours because of carbon deposition. Moreover, this reaction is endothermic and therefore requires high energy. Such disadvantage unavoidably leads to emission of additional greenhouse gases due to energy consumption during the operation of a reforming reaction.

The following Schemes (2)-(10) represent reaction mechanisms of methane and carbon dioxide over catalyst such as Ni, Ru, Rh, Pd and Pt. The Schemes (2)-(6) show methane decomposition; the Scheme (7) is carbon dioxide decomposition; the Scheme (8) is a partial oxidation of carbon deposited; the Scheme (9) is a generating reaction of carbon deposition by methane decomposition; and the Scheme (10) is a generating reaction of carbon deposition by CO decomposition.

$$CH_4 \rightarrow CH_3(ads) + H(ads) \quad (2)$$

$$CH_3(ads) \rightarrow CH_2(ads) + H(ads) \quad (3)$$

$$CH_2(ads) \rightarrow CH(ads) + H(ads) \quad (4)$$

$$CH(ads) \rightarrow C(ads) + H(ads) \quad (5)$$

$$CH_4 C(ads) + 2H_2 \quad (6)$$

$$CO_2 \rightarrow CO(ads) + O(ads) \quad (7)$$

$$C(ads) + O(ads) \rightarrow CO \quad (8)$$

$$CH_4 \rightarrow C(ads) + 2H_2 \quad \Delta H°_{298} = 74.9 \text{ KJ/mol} \quad (9)$$

$$2CO \rightarrow C(ads) + CO_2 \quad \Delta H°_{298} = -172.4 \text{ KJ/mol} \quad (10)$$

Recently, SOFC (Solid Oxide Fuel Cell) systems to generate electricity directly using methane as a fuel have been reported by Pennsylvania University in U.S.A. (S. D. Park, J. M. Vohs and R. J. Gorte, Nature 404 (2000) 265) and Oita University in Japan (T. Ishihara, T. Yamada, T. Akcay and Y. Takita, Chem. Eng. Sci. 54 (1999)1535).

In addition, the internal reforming of methane ($CH_4$) inside SOFC to generate electricity has been studied.

Meanwhile, there have been extensive researches on SOFC using hydrogen ($H_2$) as a fuel source. SOFC systems to generate electricity using hydrogen as a fuel source produced in internal/external reforming have been suggested by Mitsubishi Corporation in Japan (Satake Tokuki, Watanabe kiyoshi, Nanjo Fusayuki, Takenobu Koichi and Miyamoto Hitoshi, U.S. Pat. No. 6,316,138 (2001)), Siemens Westinghouse Power Corporation in U.S.A (Draper Robert, Veyo Stephen E., Kothmann Richard E. U.S. Pat. No. 6,610,434 (2001)). SOFCO Corporation in U.S.A. has developed a plate-type SOFC and a complex power generator of SOFC-microturbine (Galloway Terry R. U.S. Pat. No. 6,187,465 (1999)), and Schulze Corporation in Switzerland has manufactured a residential SOFC system with 1 kW capacity (Ruka Roswell J. Warner Katyryn A. U.S. Pat. No. 5,908,713 (2002)).

Oxygen ions ($O^{2-}$) in electrochemical cell are generated in cathode in accordance with the following Scheme (11):

$$0.5O_2 + 2e^- \rightarrow O^{2-} \quad (11)$$

Oxygen ions ($O^{2-}$) generated are migrated to a catalytic electrode with the help of YSZ electrolyte. Oxygen ions migrated to a catalytic electrode are then involved in the reactions of Schemes (12)-(15) to generate electricity.

$$CO + O^{2-} \rightarrow CO_2 + 2e^- \quad (12)$$

$$H_2 + O^{2-} \rightarrow H_2O + 2e^- \quad (13)$$

$$C(ads) + O^{2-} \rightarrow CO + 2e^- \quad (14)$$

$$C(ads) + 2O^{2-} \rightarrow CO_2 + 4e^- \quad (15)$$

However, there have not been reports to describe the coproduction of syngas and electricity by applying carbon dioxide ($CO_2$) and hydrocarbon such as methane ($CH_4$) as a fuel source to internal reforming process as the present invention. Where performing the internal reforming of carbon dioxide ($CO_2$) and methane ($CH_4$) in SOFC system as proposed by the present invention, the energy utilization efficiency may become maximized and the $CO_2$ usefulness may become improved because the electrochemical conversion of $CO_2$ in SOFC system permits coproduction of useful syngases and electricity. In particular, if both steam and oxygen other than carbon dioxide ($CO_2$) and hydrocarbon are simultaneously introduced to a catalytic electrode of SOFC, the exothermic oxidation of $CH_4$, steam reforming of $CH_4$ and endothermic reforming of $CO_2$ simultaneously occur, making it possible to operate the system in the conditions of an autothermal reaction as well as tri-reforming. Therefore, the SOFC system proposed by the present invention allows to reduce the energy cost to maintain reaction temperature in reforming reaction and to minimize the emission of greenhouse gases associated with energy consumption. In addition to this, the SOFC of the present invention does not require external reforming processes to produce hydrogen, which make us sure that the SOFC of this invention is significantly cost-effective and technically acceptable sequestration technique through electrochemical conversion of $CO_2$.

SUMMARY OF THE INVENTION

The present invention has developed a highly efficient electrochemical conversion system using a novel solid oxide fuel cell permitting to improve significantly the efficiency of energy utilization compared to conventional reforming reactions of $CO_2$ by $CH_4$ and to prevent catalyst deactivation due to carbon deposition through performing internal reforming reaction inside catalyst electrode of a solid oxide fuel cell.

Accordingly, it is one object of this invention to provide an internal reforming solid oxide fuel cell (IR-SOFC) to reform a mixed gas of hydrocarbon and carbon dioxide electrochemically.

It is another object of this invention to provide an electrochemical conversion system that is capable of maximizing the effect of $CO_2$ utilization by converting chemically hydrocarbon and carbon dioxide to coproduce a useful syngas and electricity with the help of the solid oxide fuel cell described above.

DESCRIPTION OF SYMBOLS INDICATED IN FIGURES

100: a reaction part; 110: a quartz reactor; 120: an electric furnace; 130: an electrochemical cell; 200: a gas feed part; 210: a needle valve; 220: a mass flow controller; 230: a gas mixer; 240: water tank; 300: an analysis part; 310: a PID temperature controller; 320: a gas chromatograph; 330: a personal computer; 340: an impedance analyzer; 350: a Potentio-Stat; 360: an electronic loader; 370: a water trap; and 380: an automatic sampling valve.

DETAILED DESCRIPTION OF THIS INVENTION

In one aspect of this invention, there is provided a solid oxide fuel cell (SOFC) for coproducing syngas and electricity by internal reforming of methane and carbon dioxide fabricated with an ion conductive solid oxide electrolyte, a catalyst electrode(anode) and an air electrode(cathode), wherein the improvement comprises: the catalyst electrode(anode) is coated with Ni-YSZ type or perovskite type metal oxide.

In another aspect of this invention, there is provided an electrochemical conversion system comprising a gas feed part(200), a reaction part(100) equipped with an electrochemical fuel cell and connected to the gas feed part and an analysis part (300) to measure and control reaction results of the reaction part, the improvement comprising: a mixed gas containing carbon dioxide and hydrocarbon is introduced to the reaction part(100) through the gas feed part(200), the reaction part(100) is equipped with a solid oxide fuel cell (SOFC) with a solid oxide electrolyte attached to an air electrode(cathode) and a catalyst electrode(anode) of Ni-YSZ type or perovskite type metal oxide, and a syngas and an electricity are simultaneously coproduced by the internal reforming of carbon dioxide by methane and the electrochemical reaction.

The present invention will be described in more detail hereunder:

The solid oxide fuel cell (SOFC) of the present invention has a structure in which one side of YSZ (Yttria Stabilized Zirconia) solid oxide electrolyte is attached to a $LaSrMnO_3$ type air electrode(cathode) and the other side is attached to a catalyst electrode(anode) of Ni-YSZ type or perovskite type metal oxide.

Figure 1:
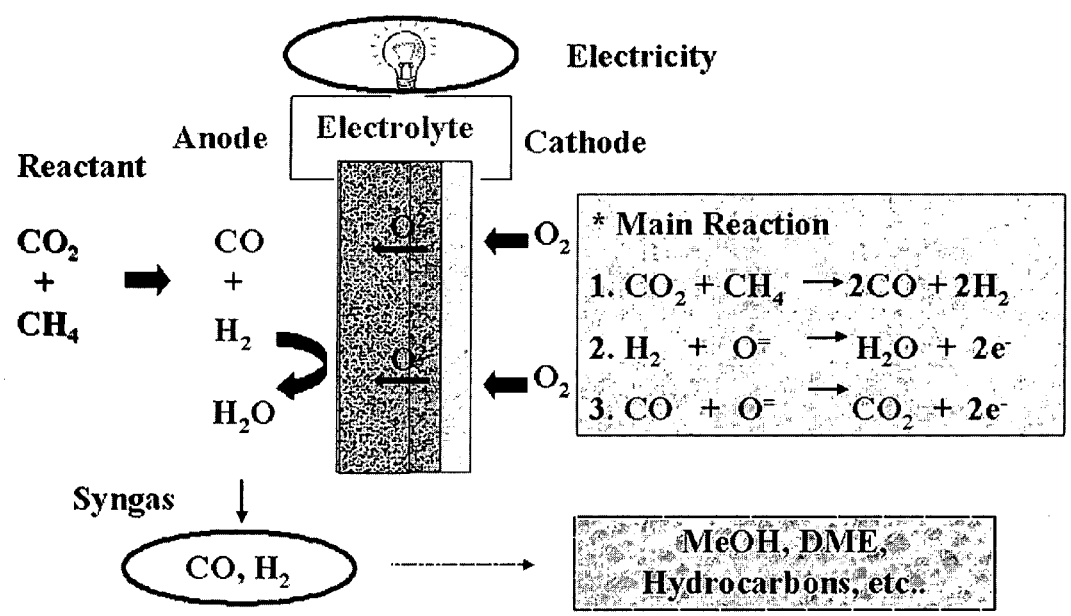
FIG. 1 schematically represents the internal reforming of carbon dioxide and hydrocarbon and electrochemical reactions occurred in the solid oxide fuel cell (SOFC).

FIG. 1 schematically represents the internal reforming of carbon dioxide and hydrocarbon and electrochemical reaction inside a single cell of the solid oxide fuel cell (SOFC) of the present invention. The mechanism of the electrochemical conversion according to this invention is described as follows: Oxygen ions ($O^{2-}$) generated from oxygen reduction at the air electrode(cathode) are passed through solid oxide electrolytes and then reacted with $H_2$ and CO gases and carbon deposit generated at the catalyst electrode(anode), resulting in the coproduction of syngas and electricity.

Ni-YSZ type oxide introduced to the catalyst electrode (anode) of the solid oxide fuel cell of this invention has a composition of 40-55 wt % of Ni, 40-55 wt % of YSZ and 0-10 wt % of $CeO_2$ or MgO. Perovskite type metal oxide has a composition of $La_{1-y}Sr_yNi_{1-x}Cr_xO_3$ (x=0-1 and y=0-1). For manufacturing the desired solid oxide fuel cell (SOFC), electrolytes are coated with metal oxide for electrode catalyst and then coated with an air electrode, or solid oxide electrolytes attached to air electrode(cathode) are coated with slurry of Ni-YSZ type or perovskite type metal oxide in the manner of tape casting.

The preparation method of the solid oxide fuel cell having Ni-YSZ type oxide as a catalyst electrode consists of 3 stages as follows: (a) preparing an aqueous precursor solution having a composition of 40-55 wt % of Ni, 40-55 wt % of YSZ and 0-10 wt % of $CeO_2$ or MgO; (b) adding and mixing 0.3-1.2 wt % of methyl cellulose, 0.8-1.5 wt % of carbonyl-methyl cellulose and 1.3-2 wt % of polyethylene oxide as a binder, and 1-5 wt % of isopropylalcohol (IPA) as a dispersant based on 100 wt % of solid content to the aqueous precursor solution, and then ball-milling to obtain a Ni-YSZ type anode slurry; and (c) coating one side of a planner-type solid oxide electrolyte with the catalyst electrode slurry prepared above and the other side with an air electrode material (LSM), drying and sintering to prepare the electrochemical cell in a disk shape.

Furthermore, the method for manufacturing the solid oxide fuel cell having perovskite type oxide as a catalyst electrode consists of 6 stages as follows: (a) preparing an aqueous solution of metal precursors having a composition of $La_{1-y}Sr_yNi_{1-x}Cr_xO_3$ (x=0-1 and y=0-1); (b) adding malic acid to the aqueous solution of metal precursors for adjusting a mole ratio of malic acid to the total metal ions to 0.5-2.0; (c) adding a pH regulator for adjusting pH of the aqueous solution of metal precursors to 1.5-3.5; (d) drying and heat-treating the aqueous solution of metal precursors to obtain powder; (e) sintering the powder at 800-1000° C. for 1-5 hr under air atmosphere to obtain a perovskite type catalyst having a composition of $La_{1-y}Sr_yNi_{1-x}Cr_xO_3$ (x=0-1 and y=0-1); and (f) coating one side of a planner-type solid oxide electrolyte with the catalyst electrode slurry prepared above and the other side with an air electrode material (LSM), drying and sintering to prepare the electrochemical cell in a disk shape.

Figure 2:
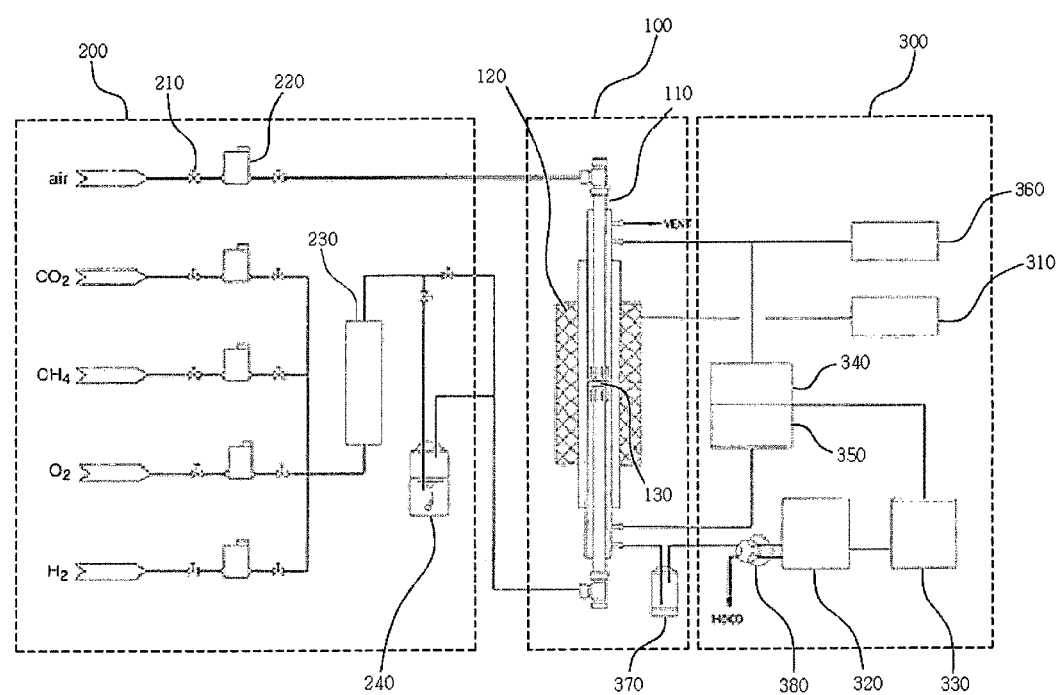
FIG. 2 schematically represents the electrochemical conversion system of carbon dioxide using the solid oxide fuel cell (SOFC).

FIG. 2 schematically represents the electrochemical conversion system employing the solid oxide fuel cell of this invention. The electrochemical conversion system depicted in FIG. 2 comprises a gas feed part(200), a reaction part(100) equipped with an electrochemical fuel cell and connected to the gas feed part and an analysis part(300) to measure and control reaction results of the gas reaction part. Each part constituting the electrochemical conversion system will be described in more detail as follows:

The reaction part(100) is constituted with a hallow quartz reactor(110) having inlet at its upper and lower columns, an electric furnace(120) surrounding the quartz reactor(110) and an electrochemical cell(130) placed at the center of the inside diameter plane of the quartz reactor(110).

Moreover, the gas feed part(200) is constructed with an air source connected to the inlet of the upper column of the quartz reactor(110); a gas mixer(230) connected to the inlet of the lower column of the quartz reactor(110); and a carbon dioxide source, a methane source, an oxygen source and a hydrogen source connected to the gas mixer(230) in a passage.

The analysis part(300) is constituted with a PID temperature controller(310) connected to the electric furnace(120); an electric loader(360) connected to the upper column of the quartz reactor(110); a Potentio-Stat(350) connected to the lower column of the quartz reactor(110); an impedance analyzer(340) connected to a connecting line between the quartz reactor(110) and the electronic loader(360); and PC(330) for control of the Potentio-Stat(350) and the impedance analyzer(340).

A water trap(370) is connected to the lower column of the quartz reactor(110), and automatic reagent injector(380) and GC(320) are connected to a connecting line to the water trap(370) in parallel.

In addition, a needle valve(210) for controlling feeding amount minutely and a mass flow controller(220) are aligned in parallel at the front line of a carbon dioxide source, a methane source, an oxygen source and a hydrogen source.

The following specific examples are intended to be illustrative of the invention and should not be construed as limiting the scope of the invention as defined by appended claims.

EXAMPLE 1

Preparation of Perovskite Type Catalyst

For manufacturing a perovskite type catalyst having a composition of $La_{1-y}Sr_yNi_{1-x}Cr_xO_3$ (x=0-1 and y=0-1), metal nitrate was used as a precursor. Oxide having a composition of $LaNiO_3$ [$La_{1-y}Sr_yNi_{1-x}Cr_xO_3$ (x=0 and y=0)] was prepared by dissolving 8.6604 g of lanthanum nitrate and 5.8162 g of nickel nitrate in 100 g of ultra-pure water. Malic acid was added to the resultant at an extent that the mole ratio of malic acid to total metal ion was 1.5. To the mixed aqueous solution, aqueous ammonia and nitric acid were added dropwise with agitation to adjust pH of the solution to 2.5. The precipitated catalyst precursor was dried at 80° C., for 6-12 hr in oven to remove water. The following viscous solution was additionally heated at 100° C., for drying. Then, the catalyst precursor was additionally heat-treated at 210° C., to thermally decompose $NO_2$ and other gases. The resulting oxide was grinded using a mortar to prepare solid powder and then, heated under air atmospheric from room temperature to 900° C., at a rate of 5° C./min, and then sintered at 900° C., for 2 hr, yielding $LaNiO_3$.

According to the procedures described above, perovskite type catalysts having various compositions indicated in Table 1 were prepared.

TABLE 1

| Perovskite catalyst | $La_{1-y}Sr_yNi_{1-x}Cr_xO_3$ (mole %) | | | | | | |
| --- | --- | --- | --- | --- | --- | --- | --- |
| | La | Sr | Ni | Cr | O | x | y |
| $LaNiO_3$ | 1 | — | 1 | — | 3 | 0 | 0 |
| $LaNi_{0.4}Cr_{0.6}O_3$ | 1 | — | 0.4 | 0.6 | 3 | 0.6 | 0 |
| $LaNi_{0.8}Cr_{0.2}O_3$ | 1 | — | 0.8 | 0.2 | 3 | 0.2 | 0 |
| $La_{0.9}Sr_{0.1}Ni_{0.6}Cr_{0.4}O_3$ | 0.9 | 0.1 | 0.6 | 0.4 | 3 | 0.4 | 0.1 |
| $La_{0.8}Sr_{0.2}Ni_{0.6}Cr_{0.4}O_3$ | 0.8 | 0.2 | 0.6 | 0.4 | 3 | 0.4 | 0.2 |

EXAMPLE 2

Preparation of Ni-YSZ Type Catalyst

For preparing Ni-YSZ type catalysts [Ni:YSZ:$CeO_2$ (or MgO)=(40-55 wt %):(40-55 wt %):(0-10 wt %)], NiO powder (99.99 Sigma-Aldrich Co.), YSZ powder (8 mol % $Y_2O_3$ doped $ZrO_2$, TOSOH Co.), MgO powder (98%, Nakarai Chemical Co.) and $CeO_2$ powder (99.9%, Sigma-Aldrich Co.) were used as a precursor.

Firstly, Ni, YSZ and $CeO_2$ (or MgO) powder were mixed in a certain amount and subject to attrition milling for 24 hr by use of zirconia ball, obtaining material for catalyst electrode. In addition, Ni-YSZ type catalysts were prepared according to co-precipitation method. Ni-YSZ type catalysts having various compositions were prepared according to the procedures described above. The compositions are summarized in Table 2.

TABLE 2

| Ni—YSZ catalyst | Ni—YSZ—$CeO_2$ | | |
| --- | --- | --- | --- |
| | NiO | YSZ | $CeO_2$ |
| | | wt % | |
| Ni—YSZ | 55 | 45 | — |
| Ni—YSZ—$CeO_2$(2 wt %) | 54 | 44 | 2 |
| Ni—YSZ—$CeO_2$(4 wt %) | 53 | 43 | 4 |
| Ni—YSZ—MgO(2 wt %) | 54 | 44 | 2 |
| Ni—YSZ—MgO(4 wt %) | 53 | 43 | 4 |

EXAMPLE 3

Manufacture of Electrochemical Cell for SOFC

The electrochemical single cells of electrolyte or anode supported SOFC were manufactured as follows:

(1) Manufacture of Single Cell for Electrolyte Supported SOFC

Firstly, YSZ electrolyte were processed using molder to prepared pellet with compact structure and sintered at 1400° C., for 2 hr, obtaining disk-shaped electrolytes. The thickness and diameter of YSZ electrolyte prepared were 1.2 mm and 22.5 mm, respectively.

Slurry for coating electrode material was prepared in accordance with the following procedures. 0.87 g of methyl cellulose, 1.14 g of CMC (carbonylmethyl cellulose) and 1.74 g of polyethylene oxide as a binder were added to 0.2 g of electrode material prepared above. 3 ml of isopropyl alcohol as a dispersant was added dropwise to the aqueous solution mixed with binders and agitated to mix well materials in slurry. After 2-hr agitation, slurry for catalyst electrode was prepared.

In addition, slurry for coating air electrode was prepared according to the procedures described above.

One side of YSZ disk was coated with slurry for catalyst electrode prepared above and then dried at 60° C., for 24 hr, followed by sintering at 1350° C., for 2 hr under atmospheric pressure. Then, the other side of YSZ disk coated with catalyst electrode was coated with slurry for air electrode, dried at 60° C., for 24 hr, and then sintered for 2 hr at 1300° C., under atmospheric pressure, giving the electrolyte supported electrochemical cell. The thickness of the catalyst and counter electrode was ca. 20 μm and their unit area was 1.0 cm$^2$(1.0 cm×1.0 cm) and 2.25 cm$^2$(1.5 cm×1.5 cm), respectively.

(2) Manufacture of Single Cell for Anode Supported SOFC

Ni, YSZ and $CeO_2$ powder were used as a precursor. At this time, NiO powder was subject to ball milling for 2 hr in planetary mill and dried in oven. NiO powder ball-milled, YSZ and $CeO_2$ powder were weighted to 53:43:4 wt % and then subject to wet ball milling. To increase open porosity of sinter materials, 24 vol % graphite power was added. Each mixed slurry was dried in a dry oven, processed and sintered at 1400° C., for 2 hr, obtaining pre-sintered material for catalyst electrode with thickness of 1.5 mm.

Slurry for coating electrolyte (YSZ) was prepared in accordance with the following procedures. 0.125 g of methyl cellulose and 0.125 g of polyvinyl alcohol as a binder were added to 2.5 g YSZ powder dissolved in 10 g of ultra-pure water. 3 ml of isopropyl alcohol as a dispersant was added dropwise to the aqueous solution mixed with binders and agitated to mix well materials in slurry. After 2-hr agitation, electrolyte slurry was prepared.

Slurry for air electrode was prepared as follows: 0.87 g of methyl cellulose, 1.14 g of carboxymethyl cellulose and 1.74 g of polyethylene oxide as a binder were added to 0.2 g of pre-made air electrode (LSM, $LaSr(MnO_3)$). 3 ml of isopropyl alcohol as a dispersant was added dropwise to the aqueous solution mixed with binders and agitated to mix well materials in slurry. After 2-hr agitation, slurry for air electrode was prepared.

One side of catalyst electrode disk was coated with electrolyte slurry prepared above and then dried at 60° C., for 24 hr, followed by sintering at 1350° C., for 2 hr under atmospheric pressure. Then, the other side of catalyst electrode disk coated with electrolyte was coated with slurry for air electrode, dried for 24 hr at 60° C., and then sintered at 1300° C., for 2 hr under atmospheric pressure, giving the anode supported electrochemical cell. The thickness of the catalyst and counter electrode was ca. 20 μm and their unit area was 4.5 cm$^2$(1.2 cm×1.2 cm) and 2.25 cm$^2$(1.5 cm×1.5 cm), respectively.

EXPERIMENTAL EXAMPLE 1

Internal Reforming and Electrochemical Properties of a Perovskite Type Catalyst Electrode ($La_{1-y}Sr_yNi_{1-x}Cr_xO_3$)

For evaluating the internal reforming of methane and carbon dioxide and electrochemical properties of the catalyst electrode prepared in Examples, the following procedures were carried out using electrochemical conversion system depicted in FIG. 2.

Mixed gas comprising $CH_4$ and $CO_2$ at a molar ratio of 1 ($CH_4/CO_2=1$, $CH_4/CO_2=12.5$ vol %:12.5 vol %) as a reactant was supplied to the anode (catalyst electrode) of a reactor at a feeding rate of 40 ml/min by using a mass flow controller (Bronkhorst HI-TEC Co.). In addition, air as an oxygen source was supplied to an air electrode (cathode) of a reactor at a feeding rate of 40 ml/min. The resulting syngas was analyzed using on-line gas chromatograph (Hewlett Packard Co., HP5890 series 11) equipped with carbosphere column ($3.18 \times 10^{-3}$ m O.D. and 2.5 m length) and TCD (thermal conductivity detector).

To control oxygen flow through YSZ disk, electric circuit was connected to cathode through platinum (Pt) line (diameter $0.5 \times 10^{-3}$ m). The electrochemical cell manufactured was sealed over alumina tube (O.D.=0.025 m, I.D.=0.019 m) using Pyrex glass (O.D.=0.025 m, I.D.=0.021 m, h=0.003 m). The reactor was placed in an electric furnace equipped with PID temperature controller (Han Young Co. P-100) and its temperature was measured by using a thermometer adjacent to an electrochemical cell.

For evaluating the internal reforming and electrical properties of a perovskite type catalyst electrode ($La_{1-y}Sr_yNi_{1-x}Cr_xO_3$), the internal reforming of $CO_2$ by $CH_4$ was executed in the electrochemical conversion system described above under a reaction condition of 800° C., and 1 atm. Mixed gas comprising $CH_4$ and $CO_2$ at a molar ratio of 1 ($CH_4/CO_2=1$, $CH_4/CO_2=12.5$ vol %:12.5 vol %) as a reactant was supplied to the anode (catalyst electrode) of a reactor at a feeding rate of 40 ml/min. In addition, air as an oxygen source was supplied to an air electrode (cathode) of a reactor at a feeding rate of 40 ml/min.

Following a 5-hr reaction, the conversion rates of $CO_2$ and $CH_4$ and current density were measured (Table 3). It was identified that the increase in Cr amount (x) in $LaNi_{1-x}Cr_xO_3$ led to the decrease in catalytic activity. Although $LaNi_{0.8}Cr_{0.2}O_3$ catalyst electrode showed high conversion rates of $CH_4$ and $CO_2$ at the initial stage of the reaction, it exhibited a decreased activity thereafter because of an abrupt formation of cork. The conversions of $CH_4$ and $CO_2$ and selectivity of $H_2$ in $La_{1-y}Sr_yNi_{1-x}Cr_xO_3$ were decreased in parallel with the increase in the amount of Cr. The selectivity of CO, however, was increased to the contrary. The catalyst deactivation due to cork deposition occurred in $LaNiO_3$ and $LaNi_{0.8}Cr_{0.2}O_3$. Therefore, it was appreciated that the composition of a $LaNi_{1-x}Cr_xO_3$ perovskite catalyst should be optimized for catalyst activity and stability with respect to cork deposition. When x is 4, the perovskite catalyst is expected to show a relatively high activity and an improved stability in $CO_2$ reforming with respect to cork deposition.

TABLE 3

Electrochemical fuel cell (catalyst electrode/YSZ/(La, Sr)MnO$_3$)

| Catalyst electrode | LaNiO$_3$ | LaNi$_{0.4}$Cr$_{0.6}$O$_3$ | LaNi$_{0.8}$Cr$_{0.2}$O$_3$ | La$_{0.9}$Sr$_{0.1}$Ni$_{0.6}$Cr$_{0.4}$O$_3$ | La$_{0.8}$Sr$_{0.2}$Ni$_{0.6}$Cr$_{0.4}$O$_3$ |
|---|---|---|---|---|---|
| Condition | Closed circuit | Closed circuit | Closed circuit | Closed circuit | Closed circuit |
| CH$_4$ conversion rate | 5 | 29 | 64 | 75 | 66 |
| CO$_2$ conversion rate | 9 | 39 | 58 | 81 | 63 |
| Current density (mA/cm$^2$) | 5 | 11 | 14 | 16 | 13 |

It can be understood that, in La$_{1-y}$Sr$_y$Ni$_{0.6}$Cr$_{0.4}$O$_3$, a partial substitution of La$^{3+}$ by Sr$^{2+}$ results in the formation of Ni$^{4+}$ and the increase of catalytic activity in reforming reaction. In considering a catalytic activity in the reforming reaction of CO$_2$ by CH$_4$, the optimal value of Sr in La$_{1-y}$Sr$_y$Ni$_{0.6}$Cr$_{0.4}$O$_3$ was elucidated to be 0.1.

In summarizing the results described previously, it could be realized for La$_{1-y}$Sr$_y$Ni$_{1-x}$Cr$_x$O$_3$ perovskite catalyst that the catalytic activity for reforming of CO$_2$ by CH$_4$ is increased in parallel with the increase of Ni content and the decrease of Cr content. The energy generation capacity in an electrocatalytic membrane reactor varies depending on catalytic activity of catalyst electrode. Therefore, upon increase of Ni content in the perovskite catalyst, the energy generating capacity is improved but the stability to reduction and cork deposition becomes worse. In particular, it was observed that La$_{0.9}$Sr$_{0.1}$Ni$_{0.6}$Cr$_{0.4}$O$_3$ catalyst (hereinafter referred to as LSNC) exhibited superiority in internal reforming of CO$_2$ by CH$_4$ and electric catalyst activity compared to perovskite catalysts having other compositions.

EXPERIMENTAL EXAMPLE 2

Internal Reforming and Electrochemical Properties of Ni-YSZ Catalyst Electrode

For evaluating the internal reforming and electrochemical properties of a Ni-YSZ type catalyst electrode, the internal reforming of CO$_2$ by CH$_4$ was executed in the electrochemical conversion system described above under a reaction condition of 800° C., and 1 atm. A mixed gas comprising CH$_4$ and CO$_2$ at a molar ratio of 1 (CH$_4$/CO$_2$=1, CH$_4$/CO$_2$=12.5 vol %:12.5 vol %) as a reactant was supplied to the anode (catalyst electrode) of a reactor at a feeding rate of 40 ml/min. In addition, air as an oxygen source was supplied to an air electrode (cathode) of a reactor at a feeding rate of 40 ml/min.

When CeO$_2$ was added to a Ni-YSZ catalyst electrode in the amount of 2 wt % or 4 wt % while using H$_2$ as a fuel source, the maximum electric energy was slightly increased. In contrast, when the reforming reaction of CO$_2$ and CH$_4$ was employed as a fuel source, the electric energy generated was decreased slightly. It can be understood that CeO$_2$ added to a Ni-YSZ catalyst electrode was responsible for the inhibition of carbon deposition and stability of catalyst electrode as well as catalytic activity. It was observed that Ni-YSZ-CeO$_2$ (Ni: YSZ:CeO$_2$=53 wt %:43 wt %:4 wt %) exhibited superiority in internal reforming of CO$_2$ by CH$_4$ and electric catalyst activity as compared to catalysts having other compositions.

Figure 3:
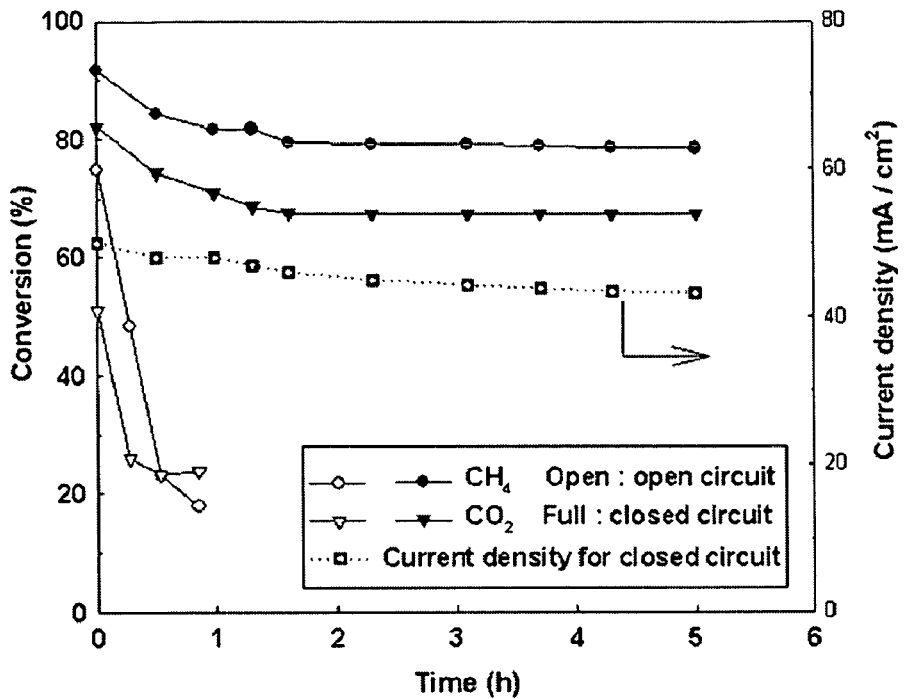
FIG. 3 is a graph showing the correlation between the conversion rates of $CO_2$ and $CH_4$ and current density over a reaction time in which the electrochemical conversion of $CO_2$ by $CH_4$ was carried out in the electrochemical cell (Ni-YSZ-$CeO_2$/YSZ/(La,Sr)$MnO_3$) under conditions of reaction temperature of 800° C., and open circuit or closed circuit.
Figure 4:
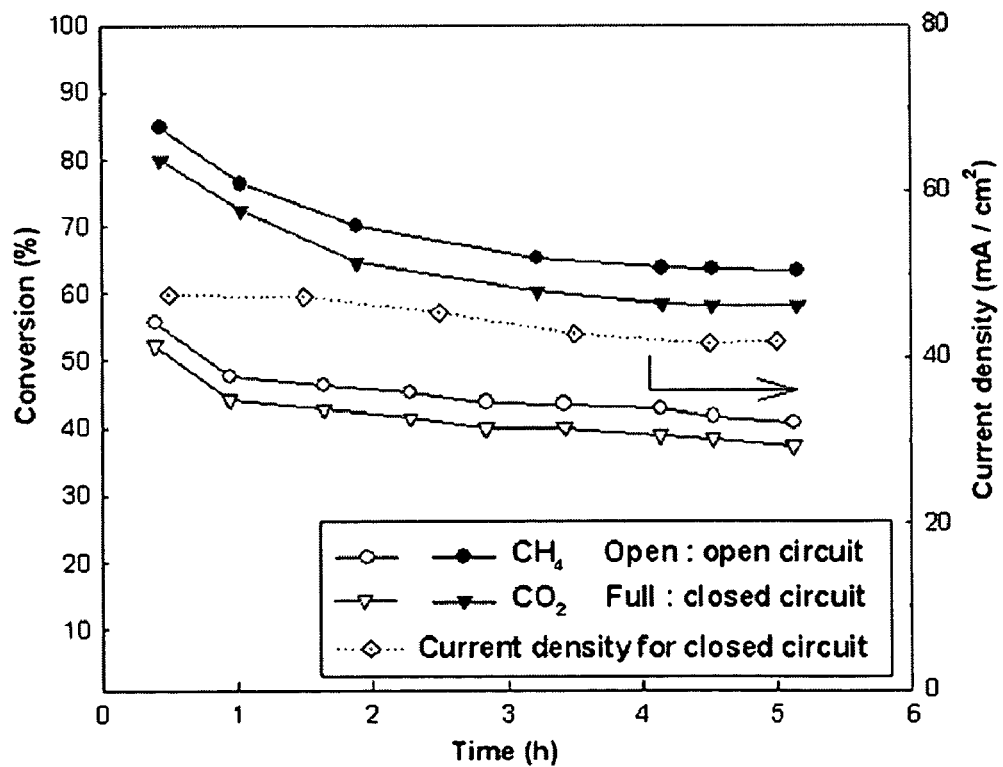
FIG. 4 is a graph showing the correlation between the conversion rates of $CO_2$ and $CH_4$ and current density over a reaction time in which the electrochemical conversion of $CO_2$ by $CH_4$ was carried out in the electrochemical cell (Ni-YSZ-MgO/YSZ/(La,Sr)$MnO_3$) under conditions of reaction temperature of 800° C., and open circuit or closed circuit.

FIGS. 3 and 4 represent the correlation between the conversion rates of CO$_2$ and CH$_4$ and current density over a reaction time in which the electrochemical conversion of CO$_2$ by CH$_4$ was carried out in the electrochemical cell ((Ni-YSZ-CeO$_2$/YSZ/(La,Sr)MnO$_3$ and Ni-YSZ-MgO/YSZ/(La,Sr)MnO$_3$)) under conditions of reaction temperature of 800° C., open circuit and closed circuit. In the open circuit, the conversion rates of CO$_2$ and CH$_4$ were decreased for about 5 hr from 48% to 15% and from 83% to 20%, respectively. In contrast, the conversion rates of CO$_2$ and CH$_4$ in the closed circuit were slightly decreased from 87% to 82% and from 96% to 73%, respectively, after undergoing a stabilizing period for about 3 hr. The extent of such decrease is much lower than that of the open circuit. The closed circuit showed 44 mA/cm$^2$ of current density after 5-hr reaction. It was identified that the deactivation of catalyst was significantly prevented in the closed circuit to provide catalyst electrode with electric current. For the reforming reaction of CO$_2$ in the open circuit, the deactivation of catalyst electrode occurred due to carbon deposition. It was suggested that O$^{2-}$ pumped from an air electrode is supplied to catalyst electrode (anode) through electrolyte and then reacted with carbon deposited, preventing carbon deposition.

Table 4 represents the conversion rates of CO$_2$ and CH$_4$ and current density after performing an electrochemical conversion reaction for 5 hr at a reaction temperature of 800° C. Although the catalytic activity in a reaction in the open circuit was sharply dropped due to carbon deposition, the deactivation of the catalyst electrode in the closed circuit was prevented presumably due to the reaction of O$^{2-}$ provided from an air electrode with carbon deposited which leads to release of CO or CO$_2$.

TABLE 4

Electrochemical cell (catalyst electrode/YSZ/(La, Sr)MnO$_3$)

| Catalyst electrode | Ni-YSZ-CeO$_2$ | | Ni-YSZ-MgO | | Ni-YSZ | | LSNC | |
|---|---|---|---|---|---|---|---|---|
| Condition* | Open | Close | Open | Close | Open | Close | Open | Close |
| CH$_4$ conversion rate (%) | 19.8 | 82.3 | 23.7 | 71.2 | 17.7 | 58.9 | 31.1 | 63.8 |
| CO$_2$ conversion rate (%) | 15.4 | 73.6 | 25.8 | 69.8 | 16.5 | 60.4 | 29.8 | 61.4 |
| Current density (mA/cm$^2$) | — | 43.9 | — | 45.3 | — | 24.9 | — | 31.7 |

*circuit condition

Figure 5:
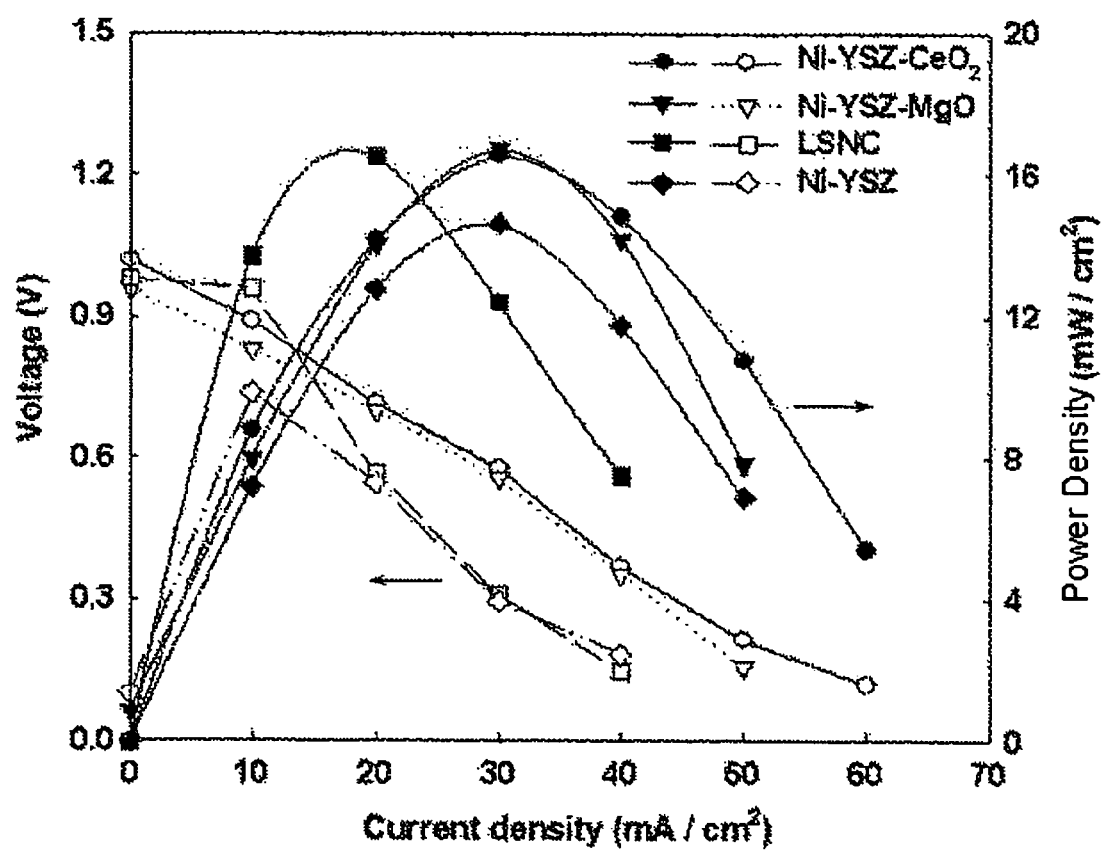
FIG. 5 is a graph showing current density, open circuit voltage (OCV) and electrochemical properties in which a fuel gas ($CH_4$:$CO_2$=12.5:12.5 vol %) was supplied to the electrochemical cell (anodes/YSZ/(La,Sr)$MnO_3$).

FIG. 5 shows the electrochemical properties of an electrochemical single cell coated with various catalyst electrodes after the reactant was supplied to the anode of the cell and electrodes were stabilized. As a result of reforming CO$_2$ and CH$_4$ in the electrochemical single cell, the voltage of closed circuit was measured to 0.9-1.1 V and its maximum power density at current density of 20-30 mA/cm$^2$ is 16 mW/cm$^2$.

EXPERIMENTAL EXAMPLE 3

The internal reforming of $CO_2$ by $CH_4$ was executed in the electrochemical conversion system described above under a reaction condition of 800° C., and 1 atm. Using a mixture containing $CH_4$, $O_2$, $H_2O$, etc. ($CH_4:CO_2:H_2O:O_2:H_2:CO=1:(0.4-0.6):(0.4-0.7):(0.01-0.2):(0.1-0.5):(0.1-0.5)$) as a reactant, the internal reforming reaction was performed under conditions of tri-reforming. The results are shown in Table 5.

TABLE 5

| Mole ratio of reactant | | | | | | $CH_4$ conversion rate (%) | $CO_2$ conversion rate (%) | Current density mA/cm² |
|---|---|---|---|---|---|---|---|---|
| $CH_4$ | $CO_2$ | $H_2O$ | $O_2$ | $H_2$ | CO | | | |
| 1 | 0.48 | 0.54 | 0.1 | 0 | 0 | 91.7 | 86.1 | 37.7 |
| 1 | 0.52 | 0.48 | 0.07 | 0 | 0 | 85.1 | 82.5 | 34.4 |
| 1 | 0.55 | 0.45 | 0.05 | 0 | 0 | 86.6 | 82.3 | 36.9 |
| 1 | 0.48 | 0.54 | 0.1 | 0.2 | 0.3 | 81.4 | 80.6 | 33.2 |
| 1 | 0.48 | 0.54 | 0.1 | 0.5 | 0.4 | 85.8 | 81.4 | 37.9 |

$CH_4$, $CO_2$, $H_2O$ and $O_2$ ($CH_4:CO_2:H_2O:O_2=1:0.48:0.54:0.1$, volume ratio) as reactants were supplied to the catalyst electrode of electrochemical cell consisting of Ni-YSZ-$CeO_2$/YSZ/(La,Sr)$MnO_3$ and the internal tri-reforming reaction was carried out. As a result, the conversion rates of $CH_4$ and $CO_2$ were elucidated to be 91.7% and 86.1%, respectively, and the current density was 37.7 mA/cm². Under a reaction condition of $CH_4:CO_2:H_2O:O_2=1:0.55:0.45:0.05$, the conversion rates of $CH_4$ and $CO_2$ and the current density also showed the similar pattern, as described in Table 5.

Since tri-reforming reaction can use as reactants $CO_2$, $H_2O$ and $O_2$ gases contained in the waste flue gas, it has an advantage to use them as a fuel source in the electrochemical conversion system proposed by this invention without separating each gas. Tri-reforming is a combined reaction of $CO_2$ reforming, steam reforming and partial oxidation of a natural gas. The simultaneous oxy-$CO_2$ system reforming concomitantly occurred in tri-reforming reaction permits to generate syngas ($CO+H_2$) useful in industry under a condition that the mole ratio of $H_2/CO_2$ ranges from 1.5 to 2.0. In addition, the tri-reforming reaction can prevent the formation of carbon that has been considered a serious problem associated with methane and $CO_2$ reforming.

The SOFC reaction system using the electrochemical fuel cell of this invention permits to coproduce a syngas and electricity through the internal reforming of greenhouse gases, $CO_2$ and $CH_4$, so that it is applicable to a variety of fields such as environment, petrochemistry, energy, ceramic and electrochemistry. In particular, greenhouse gases, $CO_2$ and $CH_4$ are convertible to hydrocarbon, MeOH or DME and therefore applicable to various petrochemical processes. If a portion of contaminants can be removed from waste gases generated from processes producing $CO_2$ and $CH_4$ as by-products, processes using hydrogen, a natural gas and petroleum as heat sources, petrochemical processes, cement processes and thermoelectric power plants, the effect of $CO_2$ recycling can be maximized without $CO_2$ recovery because of the production of syngas and electricity by electrochemical conversion system. The landfill gas(LFG) produced in waste reclaiming land contains mainly $CO_2$ and $CH_4$. Therefore, if $CO_2$ is utilizable as a reaction gas in electrochemical conversion system without separating and purifying $CO_2$ generated from waste reclaiming land, the economical process to coproduce syngas and electricity is proposed. In addition, the solid oxide fuel cell of this invention can be utilized as a dispersed power source, a supplementary power source of automobile and a power supply system in transport facilities such as ships and airplanes.

What is claimed is:

1. A solid oxide fuel cell for coproducing syngas and electricity by internal reforming of methane and carbon dioxide, comprising
    an ion conductive solid oxide electrolyte,
    a catalyst electrode (anode) and an air electrode (cathode) contacting the electrolyte, wherein said catalyst electrode (anode) comprises Ni-YSZ type or perovskite type metal oxide, and
    a gas mixture having the following gas volume ratio:
    $CH_4:CO_2:H_2O:O_2:H_2:CO=1:0.4-0.6:0.4-0.7:0.01-0.2:0-1:0-1$.

2. The solid oxide fuel cell according to claim 1, wherein one side of said solid oxide electrolyte is contacts a LaSr$MnO_3$ type air electrode (cathode) and the other side of said solid oxide electrolyte contacts a catalyst electrode (anode) of Ni-YSZ type or perovskite type metal oxide.

3. The solid oxide fuel cell according to claim 1 or 2, wherein said Ni-YSZ type metal oxide has a composition of 40-55 wt % of Ni, 40-55 wt % of YSZ and 0-10 wt % of $CeO_2$ or MgO.

4. An electrochemical conversion system, comprising
    a gas feed,
    a reactor comprising a solid oxide fuel cell having an air electrode (cathode) and a catalyst electrode (anode) of Ni-YSZ type or perovskite type metal oxide in flow communication with said gas feed,
    a gas mixture having the following gas volume ratio:
    $CH_4:CO_2:H_2O:O_2:H_2:CO=1:0.4-0.6:0.4-0.7:0.01-0.2:0-1:0-1$,
    where the gas mixture is introduced to said reactor through said gas feed.

5. The electrochemical conversion system according to claim 4, wherein the feed of $CO_2$ and $CH_4$ to said system is at least partially from a process producing $CO_2$ and $CH_4$ as by-products.

* * * * *

UNITED STATES PATENT AND TRADEMARK OFFICE
CERTIFICATE OF CORRECTION

PATENT NO. : 7,410,717 B2
APPLICATION NO. : 10/830225
DATED : August 12, 2008
INVENTOR(S) : Dong Ju Moon et al.

It is certified that error appears in the above-identified patent and that said Letters Patent is hereby corrected as shown below:

Title Page, Item (54), line 1 of title, and Column 1, Line 1:

"SOLID OXIDE FUEL CELL(SOFC) FOR" should read

--SOLID OXIDE FUEL CELL (SOFC) FOR--

Claim 2, Column 12, Line 31:

"is contacts" should read --contacts--.

Signed and Sealed this

Twenty-fourth Day of March, 2009

JOHN DOLL
*Acting Director of the United States Patent and Trademark Office*